Oct. 25, 1949.    G. H. EVANS    2,486,014
HYDROCARBON OIL DEWAXING
Filed July 6, 1945
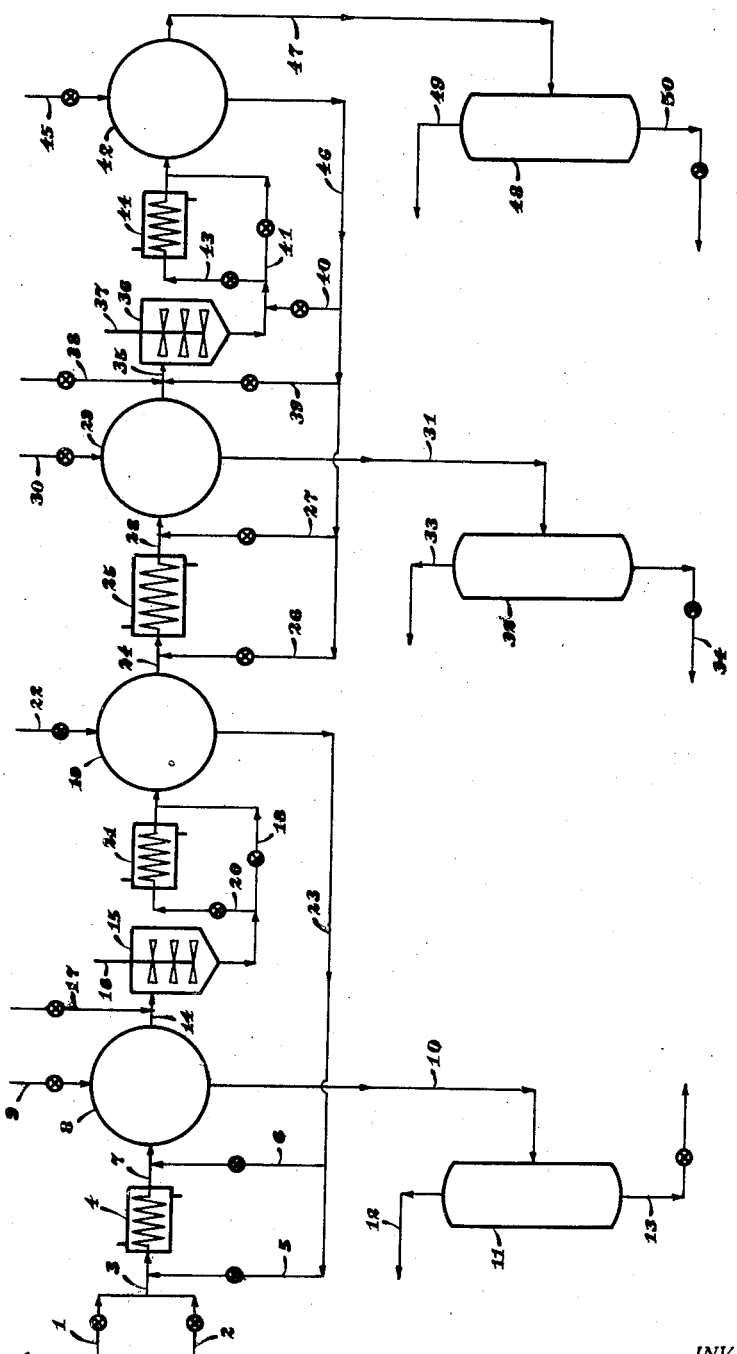
Attest
John G. Buty
Andrew T. Zodl
INVENTOR.
George H. Evans
BY Norbert E. Burch
Attorney Patented Oct. 25, 1949

2,486,014

UNITED STATES PATENT OFFICE 2,486,014

HYDROCARBON OIL DEWAXING

George H. Evans, Drexel Hill, Pa., assignor to The Atlantic Refining Company, Philadelphia, Pa., a corporation of Pennsylvania Application July 6, 1945, Serial No. 603,467

4 Claims. (Cl. 196—18)

The present invention relates to the dewaxing of hydrocarbon oil, and more particularly to separating a waxy hydrocarbon oil containing high melting and low melting waxes into oil and wax fractions.

An object of this invention is the production from a waxy hydrocarbon oil of a dewaxed, low pour point oil; a relatively high melting wax of low oil content; and a low melting wax.

A further object of this invention is the dewaxing of a waxy hydrocarbon oil and the deoiling of the resulting wax utilizing a solvent or solvent mixture having preferential solvent power for oil at the dewaxing temperature.

A still further object of this invention is the solvent dewaxing of lubricating oil and the deoiling of the wax, utilizing smaller quantities of solvent and less equipment than usually considered necessary to obtain the volume and quality of the products described herein.

My invention will be further understood with reference to the accompanying drawing which represents diagrammatically a system suitable for carrying out my process.

Referring to the drawing, a waxy hydrocarbon oil such as a deasphaltized east Texas residuum, is introduced into the system through valve-controlled pipe 1 and a solvent having preferential solvent power for oil, for example, a mixture of 40% methyl ethyl ketone, 45% benzene, and 15% toluene is introduced through valve-controlled pipe 2, and the mixture is delivered by pipe 3 to a combination mixer-chiller 4 of conventional design. Simultaneously additional wash solvent containing oil is delivered to pipe 3 by means of valve-controlled pipe 5, the source of such wash solvent being described hereinafter. The mixture of waxy oil and solvent is passed through the mixer-chiller 4 wherein the temperature of the mixture is reduced sufficiently to cause crystallization of both the high melting and low melting waxes. The temperature of the mixture may vary between $+10°$ F. and $-30°$ F., such temperature preferably being below $0°$ F., and $-15°$ F. being satisfactory to give a $0°$ F. pour point oil. If desired, the wash solvent containing oil may be introduced through valve-controlled pipe 6 after the mixture has passed through the mixer-chiller 4, the temperature of the wash solvent being approximately the same as the mixture leaving the mixer-chiller 4. The mixture, at a temperature of, for example, $-15°$ F. is passed from the mixer-chiller through pipe 7 to rotary drum filter 8 of conventional design. In the oil-solvent mixture delivered to filter 8, the ratio of solvent to oil may vary from 1:1 to 6:1, the preferred ratio being from 3:1 to 5:1. The crystallized mixture of high melting and low melting waxes is filtered from the solvent diluted oil, and the wax cake is washed on the filter with fresh solvent introduced through valve-controlled pipe 9. The filtrate comprising dewaxed, low pour point oil and solvent is passed from the filter through pipe 10 to an evaporator 11 wherein the solvent is distilled from the oil, the solvent being taken overhead through pipe 12 and condensed for reuse, and the dewaxed oil being taken as bottoms through valve-controlled pipe 13 and passed to storage (not shown).

The wax cake comprising high melting and low melting waxes, together with a considerable quantity of solvent and a smaller amount of oil, is scraped from the filter and passed through pipe 14 to vessel 15 provided with a high speed stirrer or beater 16, an additional quantity of fresh solvent being added to the wax by means of valve-controlled pipe 17. In vessel 15 the wax agglomerates are thoroughly beaten and comminuted into a slurry, thereby liberating oil and solvent entrained or occluded by the wax agglomerates. The wax-solvent slurry is drawn from the vessel 15 and passed through valve-controlled pipe 18 to rotary drum filter 19. If necessary, the temperature of the slurry may be adjusted by passing same through valve-controlled pipe 20 and chiller 21 prior to delivery to filter 19. The temperature of the slurry is approximately the same as that of the material initially introduced into filter 8, namely, about $-15°$ F., while the ratio of solvent to wax is between 2:1 and 6:1. The crystallized wax is filtered from the slurry on filter 19, and the wax cake is washed with fresh solvent introduced through valve-controlled pipe 22. The filtrate or wash comprising mostly solvent and a minor amount of oil is removed from the filter and returned by pipe 23 to either of valve-controlled pipes 5 or 6 for admixture with waxy oil and solvent to be treated in the primary filtration step.

The wax cake comprising high melting and low melting waxes, together with a considerable quantity of solvent and a minor amount of oil, is scraped from the filter 19 and the resulting pasty mass is passed through pipe 24 and heat exchanger 25 wherein the temperature of the mass is raised sufficiently to dissolve the low melting wax but not the high melting wax, i. e., to a temperature preferably about $0°$ F., for example, $+40°$ F. Either before or after the mass has passed through heat exchanger 25, wash solvent containing a very small amount of oil is introduced through valve-controlled pipes 26 or 27 and is mixed with the wax mass, the source of such wash solvent being described hereinafter. If the wash solvent is introduced through valve-controlled pipe 27, it may be necessary to employ a high speed stirrer (not shown) in series in pipe 28 in order to insure thorough mixing of the wax and solvent. The time required for bringing the wax mass up to the desired temperature may range from 5 to 60 minutes, and is about 10 to 15 minutes for raising the temperature from −15° F. to +40° F. If desired, the wax mass and solvent may be heated to miscibility temperature and then cooled to crystallize the high melting wax but not the low melting wax, although this is unnecessary provided sufficient time is made available to bring the temperature from −15° F. to equilibrium at +40° F. with crystallization of the high melting wax only. The crystallized high melting wax, in admixture with solvent containing dissolved low melting wax and minor amounts of oil, is passed from heat exchanger 25 through pipe 28 to rotary drum filter 29, the ratio of solvent to wax being within the range of 2:1 to 10:1. The high melting wax is filtered from the solvent solution at a temperature of, for example, +40° F., and the wax cake is washed on the filter with fresh solvent supplied by valve-controlled pipe 30. The filtrate comprising solvent, low melting wax, and a minor amount of oil is removed from the filter 29 and passed by pipe 31 to evaporator 32 wherein the solvent is distilled off and taken overhead through pipe 33, thereafter being condensed for reuse. The bottoms from evaporator 32 comprising low melting or "slop" wax and oil is withdrawn by means of valve-controlled pipe 34 and passed to storage (not shown).

The wax cake comprising high melting wax, together with a considerable quantity of solvent containing a minor amount of low melting wax and oil, is scraped from filter 29, and the resulting wax agglomerates are passed through pipe 35 into vessel 36 provided with a high speed stirrer or beater 37, an additional quantity of fresh solvent being added to the wax by means of valve-controlled pipe 38. If desired, a portion of the wash solvent containing minor amounts of low melting wax and oil may be introduced by valve-controlled pipe 39 to replace all or a portion of the fresh solvent from valve-controlled pipe 38. In vessel 36 the high melting wax agglomerates are thoroughly beaten and comminuted into a slurry, thereby liberating the solvent solution of low melting wax and oil entrained or occluded by the wax agglomerates. The wax-solvent slurry is drawn from the vessel 36 and passed through valve-controlled pipe 41 to rotary drum filter 42. Additional wash solvent may be added at this point, if desired, by means of valve-controlled pipe 40. If necessary, the temperature of the slurry may be adjusted by passing same through valve-controlled pipe 43 and chiller 44 prior to delivery to filter 42. The temperature of the slurry is approximately the same as that of the material initially introduced into filter 29, namely, about +40° F., while the ratio of solvent to wax is between 2:1 and 10:1. The high melting crystallized wax is filtered from the slurry on filter 42 and the wax cake is washed on the filter with fresh solvent introduced through valve-controlled pipe 45. The filtrate or wash comprising mostly solvent and a minor amount of low melting wax and oil is removed from the filter by pipe 46 and returned to one or more of valve-controlled pipes 26, 27, 39, or 40 for reuse.

The wax cake comprising high melting wax, together with a considerable quantity of solvent containing traces of low melting wax and oil, is scraped from filter 42, and the resulting mass is passed by pipe 47 to evaporator 48 wherein the solvent is distilled off and taken overhead as vapor through pipe 49, and is thereafter condensed for reuse. The bottoms comprising high melting, deoiled wax are removed from the evaporator by means of valve-controlled pipe 50 and passed to storage (not shown).

The process above described illustrates a preferred mode of operation of my invention, and while it is specific as to solvent, solvent ratios, and temperatures, it is to be understood that such factors are susceptible of considerable modification without departing from the scope of the invention. My process is applicable not only to the treatment of crude residuum, but is also adapted for the treatment of various waxy lubricating distillate stocks, selective solvent refined distillates and residuums, waxy oils from destructive distillation and hydrogenation operations, and the like. The first stage dewaxing and comminuting or repulping steps may be carried out at temperatures ranging from about +10° F. to −30° F. depending upon the pour point desired in the dewaxed oil. The second stage deoiling and comminuting steps may be carried out at any desired temperature higher than that of the first stage operation, temperatures from about 0° F. to +100° F. generally being applicable depending upon the melting point desired in the high melting wax product. The terms "high melting wax" and "low melting wax" are relative and are intended to define waxes ranging in melting point from about 120° F. to 190° F. on one hand, and waxes having melting points below about 110° F. on the other hand. These low melting or soft waxes are generally known as "slop waxes" or "liquid waxes."

With respect to dewaxing and deoiling solvents, I prefer to employ methyl ethyl ketone in admixture with sufficient benzene and toluene or other low boiling aromatic hydrocarbon to dissolve the oil but not the wax at dewaxing temperature, and to dissolve the oil and low melting wax but not the high melting wax at deoiling temperatures. Other solvents which may be employed include acetone, acetone-benzene, chlorohydrocarbons such as ethylene dichloride, dichlordifluor-methane, and trichlorethylene, alcohols such as propyl, isopropyl, butyl, or amyl alcohols, and hydrocarbons such as pentane, hexane, or naphtha, or the liquefied normally gaseous hydrocarbons including ethane, propane, and butane, or mixtures thereof. The ratio of solvent to waxy oil or wax may be varied considerably depending upon the nature of the oil, the wax content and type of wax, the character and properties of the solvent, and the temperature of operation.

My invention may be further illustrated by the following example, which, however, is not to be construed as limiting the scope thereof.

A continuous dewaxing and deoiling operation was carried out in which the waxy oil was solvent dewaxed in the first stage comprising a primary filtration and repulping at −15° F. to give a low pour point oil, followed by solvent deoiling of the wax from the first stage in a second stage comprising a secondary filtration and repulping at +40° F. to give a high melting point, deoiled wax fraction, and low melting or "slop" wax. The solvent used throughout was a mixture of 40% ethyl methyl ketone, 45% benzene, and 15% toluene. For brevity, the term "B./D." means barrels per day.

A deasphaltized, selective solvent raffinate from an East Texas residuum having an A. P. I. gravity of 29.5°, a viscosity of 101 seconds Saybolt Universal at 210° F., and a pour point of 160° F. was mixed at a rate of 1000 B./D. with 2800 B./D. of fresh solvent and 1700 B./D. of wash solvent containing 100 B./D. of oil from the first stage repulping filter. This mixture was chilled to −15° F. and filtered in the primary filter at −15° F., the filter cake being washed with 710 B./D. of fresh solvent. The filtrate and wash comprising 4460 B./D. containing 567 B./D. of dewaxed oil was distilled for the removal of solvent, and there was obtained a yield of 567 B./D. of 0° F. pour point oil having an A. P. I. gravity of 26.8° and a viscosity of 135 seconds Saybolt Universal at 210° F. The wax cake from the primary filter comprising 1754 B./D. of which 534 B./D. was wax was diluted with 916 B./D. of fresh solvent, thoroughly comminuted or pulped, filtered at −15° F. in the first stage repulping filter, and the filter cake was washed with 132 B./D. of fresh solvent. The filter cake from the first stage repulping filter comprising 1093 B./D. of which 433 B./D. was wax was brought to a temperature of +40° F. by indirect heat exchange, then diluted with 622 B./D. of wash solvent containing 40 B./D. of oil at 40° F. from the second stage repulping filter, the time required to reach equilibrium temperature being about 15 minutes. At +40° F. the low melting wax went into solution in the solvent, leaving the high melting wax in a crystalline state. This mixture was filtered in the secondary filter at +40° F. and the wax cake was washed with 113 B./D. of fresh solvent. The filtrate and wash from the secondary filter comprising 1030 B./D. of which 121 B./D. was low melting or "slop" wax was distilled for the removal of solvent, and there was obtained 121 B./D. of "slop" wax having a pour point of 80° F. The wax cake from the secondary filter comprising 803 B./D. of which 352 B./D. was wax was diluted with 496 B./D. of fresh solvent, thoroughly comminuted or pulped, filtered at +40° F. in the second stage repulping filter, and washed with 115 B./D. of fresh solvent. The filter cake from the second stage repulping filter comprising 792 B./D. of which 312 B./D. was wax was distilled for the removal of solvent, and there was obtained 312 B./D. of wax having a melting point of 170° F., an oil content of 3.1%, and a penetration of 21.

For brevity, in the appended claims, the term "methyl ethyl ketone" is to be understood to comprehend methyl ethyl ketone or mixtures thereof with aromatic hydrocarbons such as benzene and toluene, such solvents having preferential solvent power for oil but not for wax at the dewaxing temperature.

I claim:

1. A process for separating a waxy hydrocarbon oil containing high melting and low melting waxes into oil and wax fractions, which comprises commingling said waxy hydrocarbon oil with a solvent having preferential solvent power for the oil, the ratio of solvent to waxy oil being from 1:1 to 6:1, cooling the mixture to a temperature between −30° F. and +10° F. to crystallize both the high melting and low melting waxes, separating from the oil solution the crystallized wax containing entrained solvent and oil, adding solvent to the crystallized wax and comminuting the mixture, the ratio of solvent to wax being from 2:1 to 6:1, separating additional solvent and oil from the comminuted wax at a temperature between −30° F. and +10° F., commingling the wax with additional solvent, the ratio of solvent to wax being from 2:1 to 10:1, increasing the temperature of the mixture sufficiently to dissolve the low melting wax but not the high melting wax, separating the high melting wax from the low melting wax and solvent, adding solvent to the high melting wax, the ratio of solvent to wax being from 2:1 to 10:1, comminuting the mixture, and separating from the comminuted mixture, solvent containing residual oil and low melting wax.

2. A process for separating waxy hydrocarbon oil containing high melting and low melting waxes into oil and wax fractions, which comprises commingling said waxy hydrocarbon oil with a solvent having preferential solvent power for the oil, the ratio of solvent to waxy oil being from 3:1 to 5:1, cooling the mixture to a temperature of about −15° F. to crystallize both the high melting and low melting waxes, separating from the oil solution the crystallized wax containing entrained solvent and oil, adding solvent to the crystallized wax and comminuting the mixture, the ratio of solvent to wax being from 2:1 to 6:1, separating additional solvent and oil from the comminuted wax at a temperature of about −15° F., commingling the wax with additional solvent, the ratio of solvent to wax being from 2:1 to 10:1, increasing the temperature of the mixture to about +40° F. to dissolve the low melting wax but not the high melting wax, separating the high melting wax from the low melting wax and solvent, adding solvent to the high melting wax, the ratio of solvent to wax being from 2:1 to 10:1, comminuting the mixture, and separating from the comminuted mixture at a temperature of about +40° F., solvent containing residual oil and low melting wax.

3. A process for separating a waxy hydrocarbon oil containing high melting and low melting waxes into oil and wax fractions, which comprises commingling said waxy hydrocarbon oil with methyl ethyl ketone having preferential solvent power for the oil, the ratio of methyl ethyl ketone to oil being from 1:1 to 6:1, cooling the mixture to a temperature between −30° F. and +10° F. to crystallize both the high melting and low melting waxes, separating from the oil solution the crystallized wax containing entrained methyl ethyl ketone and oil, adding methyl ethyl ketone to the crystallized wax and comminuting the mixture, the ratio of methyl ethyl ketone to wax being from 2:1 to 6:1, separating additional methyl ethyl ketone and oil from the comminuted wax at a temperature between −30° F. and +10° F., commingling the wax with additional methyl ethyl ketone, the ratio of methyl ethyl ketone to wax being from 2:1 to 10:1, increasing the temperature of the mixture sufficiently to dissolve the low melting wax but not the high melting wax, separating the high melting wax from the low melting wax and methyl ethyl ketone, adding methyl ethyl ketone to the high melting wax, the ratio of methyl ethyl ketone to wax being from 2:1 to 10:1, comminuting the mixture, and separating from the comminuted mixture, methyl ethyl ketone containing residual oil and low melting wax.

4. A process for separating waxy hydrocarbon oil containing high melting and low melting waxes into oil and wax fractions, which comprises commingling said waxy hydrocarbon oil with methyl ethyl ketone having preferential solvent power for the oil, the ratio of methyl ethyl ketone to oil being from 3:1 to 5:1, cooling the mixture to a temperature of about −15° F. to crystallize both the high melting and low melting waxes, separating from the oil solution the crystallized wax containing entrained methyl ethyl ketone and oil, adding methyl ethyl ketone to the crystallized wax and comminuting the mixture, the ratio of methyl ethyl ketone to wax being from 2:1 to 6:1, separating additional methyl ethyl ketone and oil from the comminuted wax at a temperature of about −15° F., commingling the wax with additional methyl ethyl ketone, the ratio of methyl ethyl ketone to wax being from 2:1 to 10:1, increasing the temperature of the mixture to about +40° F. to dissolve the low melting wax but not the high melting wax, separating the high melting wax from the low melting wax and methyl ethyl ketone, adding methyl ethyl ketone to the high melting wax, the ratio of methyl ethyl ketone to wax being from 2:1 to 10:1, comminuting the mixture, and separating from the comminuted mixture at a temperature of about +40° F., methyl ethyl ketone containing residual oil and low melting wax.

GEORGE H. EVANS.

REFERENCES CITED

The following references are of record in the file of this patent:

UNITED STATES PATENTS

| Number | Name | Date |
| --- | --- | --- |
| 2,031,118 | Merrill | Feb. 18, 1936 |
| 2,194,968 | Bray et al. | Mar. 26, 1940 |
| 2,229,658 | Jenkins | Jan. 28, 1941 |
| 2,234,916 | Jones | Mar. 11, 1941 |
| 2,302,434 | Dons et al. | Nov. 17, 1942 |
| 2,370,297 | Engel | Feb. 27, 1945 |
| 2,370,453 | Dons et al., II | Feb. 27, 1945 |
| 2,446,514 | Stewart et al. | Aug. 3, 1948 |